Oct. 6, 1959 E. SCHULZ 2,907,698
PROCESS OF PRODUCING COKE FROM MIXTURE OF COKE BREEZE AND COAL
Filed March 19, 1956 2 Sheets-Sheet 1

INVENTOR.
Erich Schulz
BY Michael S. Striker

Oct. 6, 1959             E. SCHULZ             2,907,698

PROCESS OF PRODUCING COKE FROM MIXTURE OF COKE BREEZE AND COAL

Filed March 19, 1956             2 Sheets-Sheet 2

INVENTOR.
Erich Schulz
BY Michael S. Striker
Agt.

United States Patent Office 2,907,698
Patented Oct. 6, 1959

2,907,698

PROCESS OF PRODUCING COKE FROM MIXTURE OF COKE BREEZE AND COAL

Erich Schulz, Bremen, Germany

Application March 19, 1956, Serial No. 572,460

Claims priority, application Germany October 7, 1950

3 Claims. (Cl. 202—25)

The present application is a continuation-in-part application of my copending application, "Process of Producing Coke From Mixture of Coke Breeze and Coal," filed under the Serial No. 246,713 on September 14, 1951, now abandoned.

The present invention relates to a method of crushing particles between crushing rollers, and more particularly to a method of crushing coke breeze.

It is an object of the present invention to provide for a method of crushing particles which is very efficient and in which the amount of energy for crushing a given amount of particles is considerably reduced in comparison to known methods.

It is another object of the present invention to provide for a method of crushing particles in which the wear of the crushing rollers is reduced.

It is a further object of the present invention to rotate the crushing rollers at a circumferential speed considerably greater than the speed at which the particles are supplied to the rollers.

It is an additional object of the present invention to provide for a method of crushing particles which is especially adapted to prepare and crush coke breeze in a special way so that the pores of the crushed coke breeze are not filled with coke dust during the crushing process.

It is a further object of the present invention to completely utilize the increased amount of coke breeze produced during breaking up of coke into suitable grades, and thereby to avoid waste of coke.

It is yet another object of the present invention to produce first grade coke containing a high proportion of coke breeze.

With these objects in view, the method of crushing particles between a pair of crushing rollers according to the present invention mainly comprises the steps of rotating the crushing rollers at a predetermined speed at which a predetermined maximum amount of particles supplied to the crushing rollers is adapted to be crushed by the same, and supplying to these rotating rollers a smaller amount of particles than the predetermined maximum amount.

The crushing rollers are thereby preferably rotated at a circumferential speed of 25 to 40 meters per second and the material is fed to the crushing rollers at a speed substantially smaller than the circumferential speed of the crushing rollers.

The method of crushing particles according to the present invention is advantageously used for crushing coke breeze, thereby the crushed coke breeze is separated from the coke breeze supplied to the crushing roller and filling of the open surface pores of the crushed coke breeze with coke dust is prevented.

A process according to the present invention may further comprise the steps of at least partly filling open surface pores of crushed coke breeze with coal powder, mixing the thus-treated coke breeze with coal, and coking the thus obtained mixture whereby a coke cake is produced by anchoring coked coal by coked coal powder contained in the pores of the crushed coke breeze.

The novel features which are considered as characteristic for the invention are set forth in particular in the appended claims. The invention itself, however, both as to its construction and its method of operation, together with additional objects and advantages thereof, will be best understood from the following description of specific drawings, in which:

Figure 1:
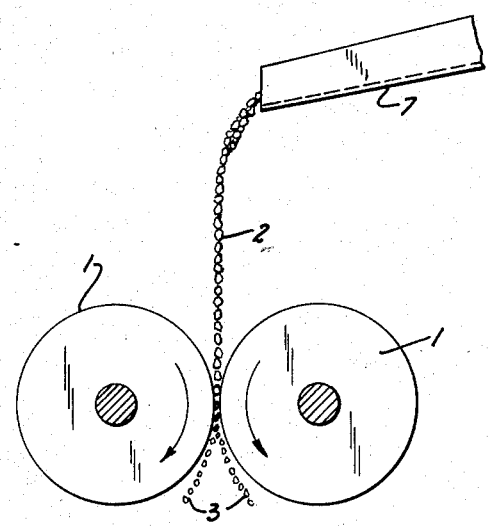
Fig. 1 is a schematic cross-sectional view illustrating the manner in which particles are supplied to and treated by crushing rollers in accordance with the present invention.

The method of crushing pieces or particles between a pair of crushing rollers according to the present invention is schematically illustrated in Fig. 1 of the drawings. A pair of crushing rollers 1, 1 spaced from each other by a small gap are rotated in opposite direction as indicated by the arrows. The material 2 to be crushed by the crushing rollers is fed from a chute 7 located a short distance above the crushing rollers in a continuous stream into the gap between the crushing rollers and onto the opposite surfaces of the rollers. It is to be understood that the width of the chute 7 is substantially equal to the lengths of the crushing rollers so that the stream of material is evenly distributed over the length of the crushing rollers 1.

In known crushing mills of this type, the crushing rollers are rotated at a speed of about 3 to 4 meters per second and the material is fed to the crushing rollers in such an amount that the fed material accumulates above the crushing rollers. Contrary to this usual method, the material to be crushed is fed, according to the method of the present invention, between the crushing rollers 1, 1 in an amount which is smaller than the maximum amount which can be crushed by the crushing rollers when the same are rotated with a given speed.

The crushing rollers 1, 1 are rotated at a speed considerably greater than used in known crushing mills. Preferably these crushing rollers are rotated at a circumferential speed of 25 to 40 meters per second and the material is fed to the crushing rollers at a speed substantially smaller than the circumferential speed of the crushing rollers, i.e. 2 to 10 meters per second. The speed at which the material is fed between the crushing rollers is preferably from one quarter to one thirteenth of the circumferential speed of the crushing rollers. Since the circumferential speed of the crushing rollers is relative very high, rollers of relative small diameter of about 400 to 500 millimeters are preferred. Rollers with grooved or smoothed surfaces are used, though rollers with smooth surfaces are preferred.

Preferably the crushing rollers 1, 1 are mounted in bearing blocks which in turn are slidably arranged on rails for movement towards and away from each other. Heavy springs are provided to press these bearing blocks and the rollers mounted thereon towards each other and adjustable stops are provided to adjust the distance between the rollers. Thereby it is possible to adjust the size of the particles obtained by the crushing process to any desired degree. The use of crushing mills in which the crushing rollers do not touch each other has the great advantage that the speed of the crushing rollers can be considerably increased over the speed of crushing rollers in which the crushing rollers touch each other.

Since, according to the present invention, the amount of particles of material fed to the crushing rollers is considerably smaller than the amount which can be crushed by the crushing rollers at the respective high circumferential speed, the accumulation of material to be crushed above the crushing rollers is prevented. Since the circumferential speed of the crushing rollers is further considerably higher than the speed at which the material is fed to the crushing rollers, the crushing is done with an impact and the particles are separated during the crushing from the stream of particles of material supplied to the crushing rollers. Furthermore, the crushed particles obtain, due to the high circumferential speed of the crushing rollers, such a speed that they are thrown off the crushing rollers in substantially tangential direction after passing the gap between the crushing rollers and thereby these crushed particles have no chance to stick to the surfaces of the crushing rollers. The process is therefore especially adapted for the crushing of wet material which in conventional crushing mills has a tendency to stick to the surfaces of the crushing rollers after being crushed whereby the wear of these crushing rollers is considerably increased. This disadvantage is completely avoided with the method according to the present invention since the particles are thrown off the surfaces of the crushing rollers as soon as they are crushed. Experience has also shown that the crushing process according to the present invention requires a considerably smaller amount of energy for crushing the same amount of material than crushing processes with slowly rotating crushing rollers.

In known roller mills, consisting of two cooperating rollers between which the material is crushed, the peripheral speed of the rollers is 2–3 meters per second, while the material is supplied at the speed of 3–4 meters per second. Consequently, the material accumulates between the rollers before being crushed or is just as fast crushed and removed, as supplied.

In the arrangement according to the present invention the peripheral speed of a pair of cooperating crushing rollers is 4 to 13 times as high as usual for crushing rollers, for instance from 25 to 40 meters per second, while the material is supplied at a speed of about 2 to 10 meters per second. Consequently, the peripheral speed of the crushing rollers may be more than ten times the speed of the supplied material falling between the rollers.

The method of crushing particles between a pair of crushing rollers as described above is advantageously used for crushing of coke breeze which in turn is subsequently used for the preparation of high grade coke.

During the grading of coke which comprises breaking up into pieces of different size and sifting, coke breeze having a size up to 10 mm. is produced, the amount of the coke breeze depending on the quality of the coke which is broken up, and the size of the pieces the desired broken up product consists of.

Regular raw coke of 75% to 80% strength, when broken up between rollers spaced 90 mm., produce 40% of grade I, 35% of grade II, 15% of grade III and 5% of grade IV coke, and approximately 5% coke breeze.

If the yield of the most desirable grade III is increased to 50% by reducing the distance between the breaking rollers, 15% of coke breeze is produced. Since the price of coke breeze is less than half of the price of the regular grades I, II, III, which have the same price, producing a greater proportion of the grade III which is mostly used by small consumers becomes uneconomical for the producer.

Utilizing of the coke breeze has been attempted by adding the same to bituminous coal and coking the mixture. However, in the event that more than 5% of coke breeze is added to the coal, the coke produced from a mixture of bituminous coal and coke breeze is soft and tends to break into small pieces.

The process according to the present invention permits adding of a much higher percentage of coke breeze to coal for coking together and, moreover, permits production of a first grade coke regardless of changes in the proportion between the coke breeze and the coal.

According to a preferred process of the present invention the coke breeze is first broken up in a mill into pieces of suitable size, the size depending on the size of the pores of the raw coke which is used. The broken pieces of coke breeze have opened pores. Coal dust is filled into the pores and adheres to the surface of the same.

In order to prepare the coke breeze in the manner which is most suitable for the later filling with coal powder, the edges of the pores should be retained as much as possible so that each pore has a large, irregular and jagged surface to which the coal powder can easily adhere. Also, it must be prevented that the pores of the coke breeze are filled by coke dust during the breaking up process. In the generally used coke mills the above conditions are not assured. In ball mills and rod mills the coke breeze is continuously rubbed so that the sharp edges of the coke breeze pieces are ground off while in contact with the other pieces, and, moreover, coke powder enters the pores and fills the same.

Since it is of utmost importance for the object of the present invention that the pores of the coke breeze remain free of coke powder and have sharp jagged edges, a special crushing process must be employed. In order to fulfill the above described conditions, the coke breeze must be broken up into particles of suitable size in a manner by which the filling of the surface pores of the crushed particles by coke powder is prevented during the crushing process. For this purpose, crushing rollers with smooth or grooved roller surfaces are used. These rollers are rotated at a predetermined speed at which a predetermined maximum amount of coke breeze can be crushed by the rollers. However, the coke breeze is supplied to the rotating rollers in an amount smaller than the amount the crushing rollers are able to crush between themselves at the speed they are rotating. In this way, an accumulation of coke breeze on top of the crushing rollers is prevented and each particle is individually gripped by the rollers, moved at high speed out of the mass of supplied coke breeze, crushed between the rollers in a fraction of a second and thrown out before the following breeze particle is gripped by the rollers. As the crushed particles are thrown out from the space between the rollers separated from each other, a blunting of the edges of the fractured particles by mutual engagement is prevented, and the opened surface pores remain free of coke dust.

The process as schematically illustrated in Fig. 1 and as described above is therefore preferably used for crushing the coke breeze. In this case the crushing rollers are preferably rotated at a speed of about 36 meters per second while the material is supplied to the crushing rollers 1, 1 from the chute 7 at a speed of about 3 meters per second. Since the amount of coke breeze fed to the crushing rollers is, as described above, considerably smaller than the crushing rollers are able to crush at the given speed, coke breeze cannot accumulate on the top of the crushing rollers. Furthermore, since the coke breeze is supplied in a steady stream at low speed to the rollers rotating at high speed, the crushed particles are separated from the supplied coke breeze during the crushing process. Consequently, coke dust cannot enter the pores of the crushed breeze during the crushing process. By preventing accumulation of coke breeze on top of the crushing rollers, the coke breeze is not only crushed in the way as described above, but the amount of energy necessary for driving the crushing rollers is reduced and excessive wear of the crushing rollers is prevented.

Figure 2:
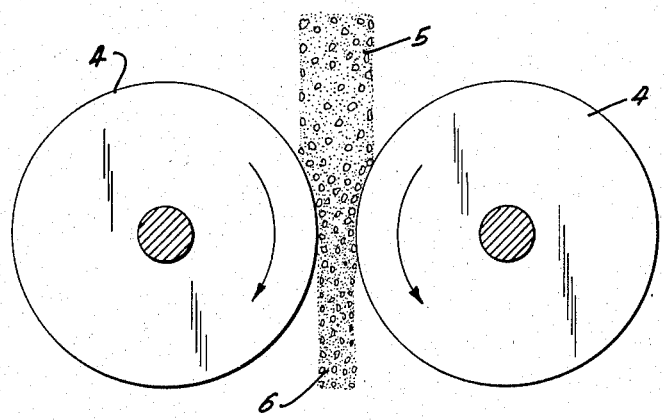
Fig. 2 is a schematic cross-sectional view illustrating the manner in which surface pores of coke breeze, crushed into pieces in accordance with the method of the present invention, are filled with coal powder.

The filling of the surface pores of the coke breeze pieces with coal powder may be carried out by application of pressure, for instance by pressing between smooth or grooved rollers. Such an arrangement is schematically illustrated in Fig. 2 in which a mixture of crushed coke breeze pieces and coal powder 5 is supplied to a pair of cooperating pressure rollers 4 which press the mixture together while it passes between the rollers. Thereby coal power is pressed into the pores of the coke breeze pieces and these pieces leave the pressure rollers in a steady stream 6 with their pores filled with coal powder. The mixture, after leaving the pressure rollers, has therefore a higher density even after again being loosely piled up.

For example, 9 parts of coal powder containing approximately 15% particles having a diameter below 0.1 millimeter, 30% particles having a diameter between 0.1 millimeter to 1 millimeter, and 45% particles having a diameter between 1 millimeter and 2 millimeters, and 10% pulverised coal consisting of particles having diameters not greater than 5 millimeters are mixed with one part of coke breeze containing for instance 60% particles below 0.5 millimeter, and 40% slightly larger, and then pressed between the rollers at a pressure of 200 to 400 kilograms per square centimeter. Thereby the finest coal powder particles are pressed into the surface pores of adjacent coke breeze pieces.

Also, it is possible to electro-statically charge the coke breeze and the coal powder so that they are attracted to each other and the coal dust adheres to the pores of the coke breeze when brought into close contact with the same. It is also possible to force the coal dust into the pores of the coke breeze hydraulically by flotation and by applying coal powder suspended in water to coke breeze. In this method the water content of the coal to be used in the coking process must be considered.

The process according to the present invention permits to add 10%, 20% and up to 30% of coke breeze to fat coal or bituminous coal while at the same time the quality of the coke is improved comparing with coke produced from coal alone. During the coking of coal together with coke breeze containing coal powder in the pores of its pieces, coke breeze and the coke produced from the added coal are bound together by the action of the coal powder to form a cake so that the finished product does not show that it is partly produced of coke breeze, even if 30% of coke breeze was added.

The firmness of the finished product and its resistance against breaking is increased comparing with coke produced from coal only. Consequently, a smaller quantity of coke breeze is produced in the following breaking up of the coke cake into the usual grades so that an optimal result with respect to the quality of the coke and to the production of coke breeze is attained by repeated application of the process. A larger portion of the coke produced according to the present invention can be broken up into the most desirable grade III of the coke, and, if necessary, only the grade III may be produced. The coke breeze produced thereby is again added to coal which is to be coked so that it is possible to obtain for coke breeze the price of the most desirable grade of coke.

Figure 3:
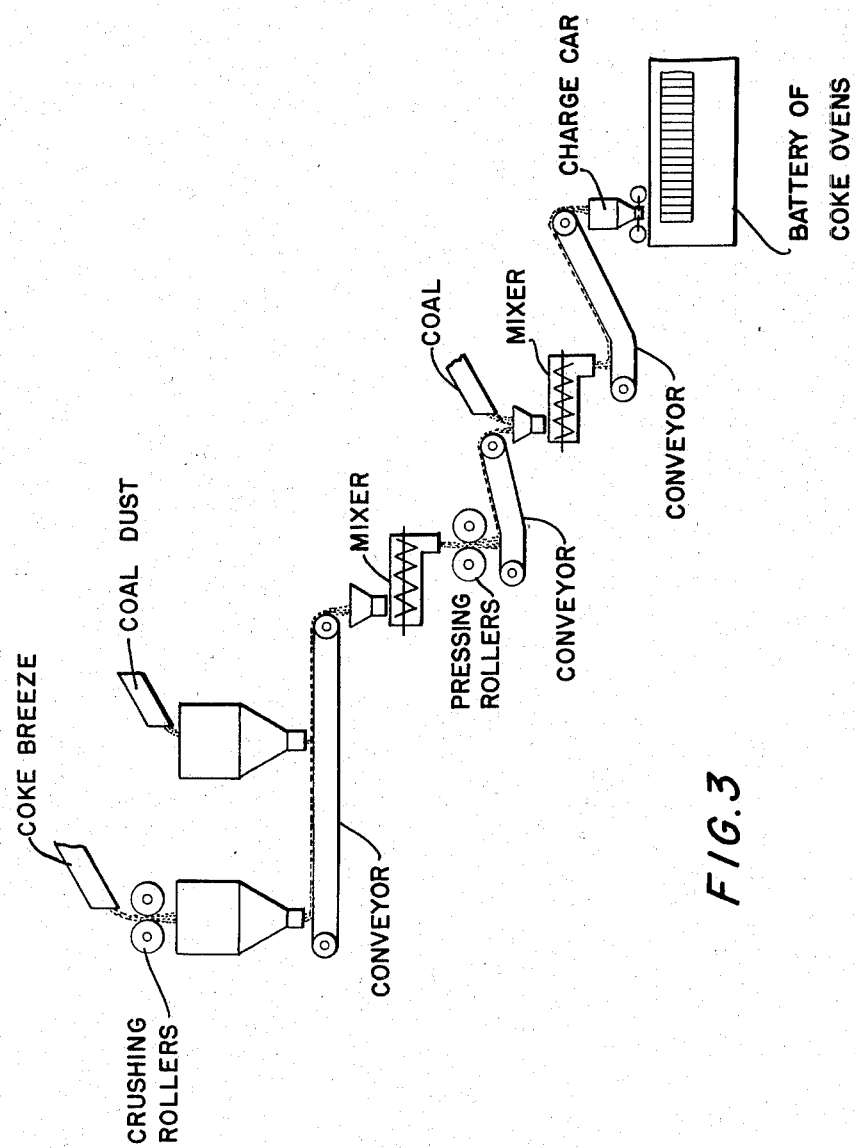
Fig. 3 is a flow sheet schematically illustrating the production of first grade coke from coke breeze crushed and prepared according to the present invention.

This process is schematically illustrated in the flow sheet shown in Fig. 3 of the drawings. A crushing mill as schematically shown in Fig. 1 of the drawings and in which the crushing process as described above is used is shown in the upper left hand corner of the flow sheet. Coke breeze is fed to these crushing rollers and crushed thereby as described and the crushed coke breeze falls then on a conveyor band shown beneath the crushing rollers. Coal dust is simultaneously fed from another chute to the same conveyor band and the two materials are then fed into a mixer shown at the right end of the conveyor band. From this mixer the coke breeze thoroughly mixed with coal dust falls between pressing rollers similar to the pressing rollers schematically shown in Fig. 2 of the drawings and after passing the pressing rollers and being compressed thereby the material falls onto another conveyor band and is fed thereby into a second mixer. Coal is fed from an additional chute into this second mixer and the mixed materials are then fed by a third conveyor to a charge car by which the mixture is transported to a battery of coke ovens shown at the right lower corner of the flow feed. There the mixture of coke breeze the pores of which are filled with coal dust as described and coal are transformed to a high grade coke.

While the cost of the process has to be deducted, the same is only approximately half the price per ton of the added coke breeze and a considerable margin is left when the process of the present invention is applied. Besides the improvement of the quality of the produced coke, and besides the economical advantage, a further advantage of the process is the homogeneous and uniform distribution of particles of coke breeze in the coal during the coking process, whereby a porous frame is formed in the cake, through which the by-products such as gases and condensates may be more easily carried away. Furthermore, the coke breeze constitutes a frame in the developing coke cake which does not shrink in size during the coking so that the coke cake fills the chamber completely and does not shrink as coke produced of coal alone. Consequently, the developing gases and condensates can escape directly out of the coke cake through the conduits provided therefor and are not exposed to a damaging influence of the heated walls of the chamber as it is the case when the same are separated from the coke cake by the shrinking of the produced coke produced from coal alone. As a result decomposing of the gases is prevented and a higher caloric value of the obtained gases is achieved.

It will be understood that each of the steps described above, or two or more together, may also find a useful application in other types of processes for crushing particles differing from the types described above.

While the invention has been illustrated and described as embodied in a process for crushing coke breeze between rollers having a high circumferential speed, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing coke from coal and coke breeze, comprising, in combination, the steps of supplying coke breeze to a pair of crushing rollers; rotating said crushing rollers at such rotary speed that the peripheral speed of said crushing rollers is higher than the speed at which said coke breeze is supplied whereby crushed coke breeze is separated from supplied coke breeze and filling of the opened surface pores of the crushed coke breeze with coke dust is prevented; at least partly filling open surface pores of the crushed coke breeze with coal powder; mixing the thus treated coke breeze with coal; and coking the thus obtained mixture whereby a coke cake is produced by anchoring coked coal by coked coal powder contained in the pores of the crushed coke breeze.

2. A method of producing coke from coal and coke breeze, comprising, in combination, the steps of supplying coke breeze to a pair of crushing rollers; rotating said crushing rollers at such rotary speed that the peripheral speed of said crushing rollers is higher than the speed at which said coke breeze is supplied whereby crushed coke breeze is separated from supplied coke breeze and filling of the opened surface pores of the crushed coke breeze with coke dust is prevented; pressing together a mixture of said crushed coke breeze with coal powder whereby the opened surface pores of the crushed coke breeze are filled with coal powder; mixing the thus treated coke breeze with coal; and coking the thus obtained mixture whereby a coke cake is produced by anchoring coked coal by coked coal powder contained in the pores of the crushed coke breeze.

3. A method of producing coke from coal and coke breeze, comprising, in combination, the steps of supplying coke breeze to a pair of crushing rollers; rotating said crushing rollers at such rotary speed that the peripheral speed of said crushing rollers is higher than the speed at which said coke breeze is supplied whereby crushed coke breeze is separated from supplied coke breeze and filling of the opened surface pores of the crushed coke breeze with coke dust is prevented; pressing together between a pair of pressure rollers a mixture of said crushed coke breeze with coal powder whereby the opened surface pores of the crushed coke breeze are filled with coal powder; mixing the thus treated coke breeze with coal; and coking the thus obtained mixture whereby a coke cake is produced by anchoring coked coal by coked coal powder contained in the pores of the crushed coke breeze.

References Cited in the file of this patent

UNITED STATES PATENTS

| | | |
|---|---|---|
| 672,617 | Edison | Apr. 23, 1901 |
| 978,236 | Tobelman | Dec. 13, 1910 |
| 1,824,526 | Andrews | Sept. 22, 1931 |
| 1,941,462 | Bunce | Jan. 2, 1934 |
| 1,948,472 | Loebell et al. | Feb. 20, 1934 |

FOREIGN PATENTS

| | | |
|---|---|---|
| 17,225 | Germany | Apr. 26, 1881 |
| 3,704 | Great Britain | July 28, 1883 |
| 351,854 | Great Britain | July 2, 1931 |

OTHER REFERENCES

Taggart: "Handbook of Mineral Dressing," 1945, published by John Wiley & Sons, Inc., London (pp. 4–66, 4–67, 4–72 and 4–73).